2,954,896

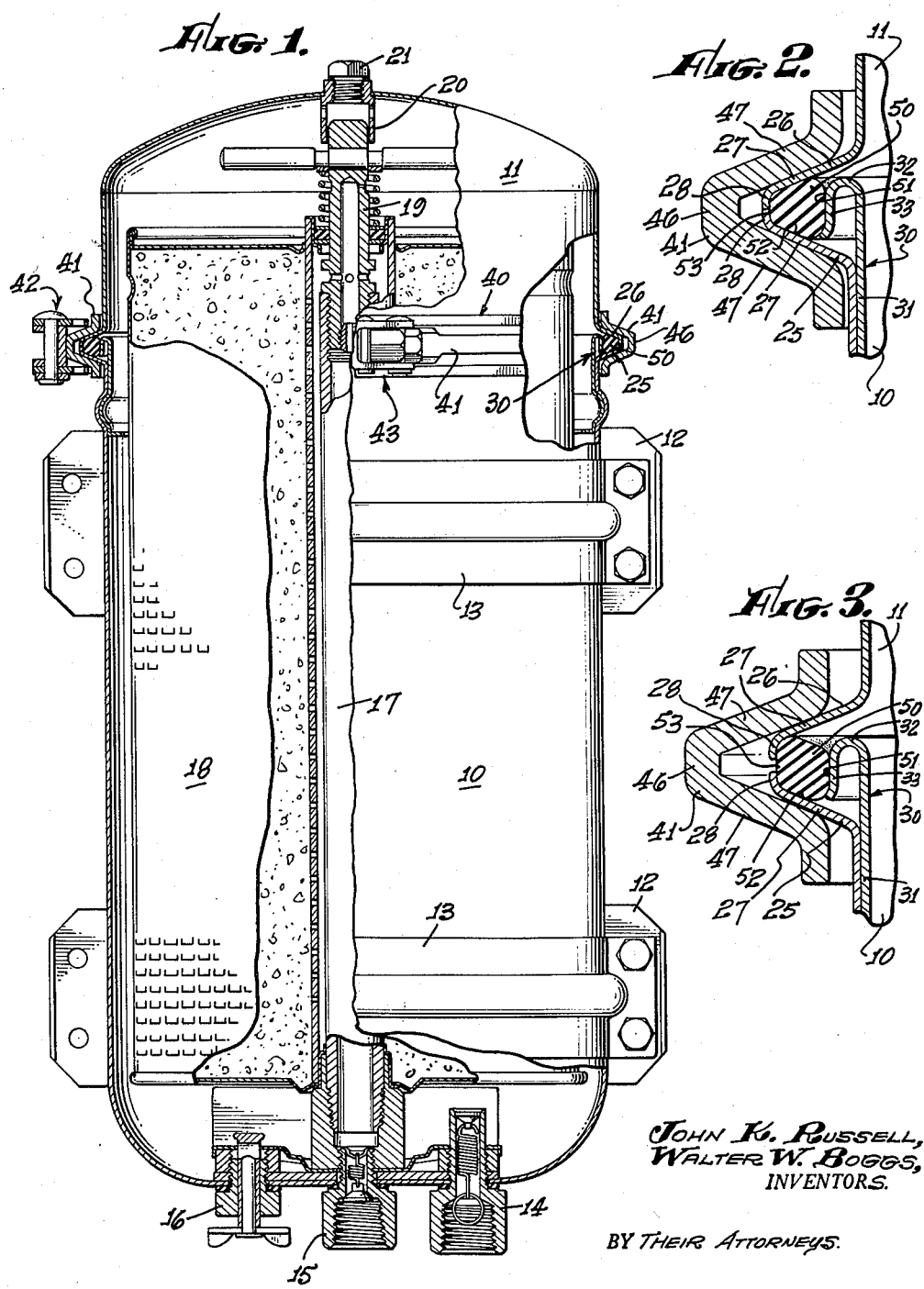

COVER GASKET

John K. Russell and Walter W. Boggs, Los Angeles, Calif., assignors to Luber-Finer Incorporated, Los Angeles, Calif., a corporation of California Filed May 26, 1958, Ser. No. 737,888

1 Claim. (Cl. 220—46)

This invention relates to a gasket for sealing the cover of an oil filter container or the like and is a substitute for and improvement over the conventional O-ring seal.

In the conventional oil filter container, an annular gasket receptacle is provided having a V-shaped cross section. This receptacle ordinarily has a cylindrical inner wall and a conical bottom joining the inner wall at an acute angle. O-ring gaskets produce very substantial mechanical loads on such a container when it is sealed and considerable mechanical effort is required to effect the sealing. This high loading results from the large material displacement necessary in deforming the round gasket to the sealed position.

It is an object of the invention to provide a gasket which will not produce these severe mechanical stresses in the container being sealed. A further object of the invention is to provide such a gasket having a cylindrical inner wall and a conical bottom which intersects the inner wall at an acute angle. A further object of the invention is to provide such a gasket with parallel, concentric inner and outer walls and having a trapezoidal cross-section and, in particular, a cross section in the form of an oblique-angled parallelogram.

The normal operating temperature of an oil filter is in the order of 200° F., at which temperature the life of the gaskets is considerably reduced. It is an object of the invention to provide a gasket having a high recovery factor and, therefore, a longer operating life. Another object of the invention is to provide such a gasket in which there is a minimum displacement of gasket material during the sealing operation so that the ability of the gasket to recover its initial shape is not seriously affected.

Other objects, advantages, features and results of the invention will more fully appear in the course of the following description where a preferred embodiment is given by way of illustration or example.

Fig. 1 shows a conventional oil filter and container, partly in section, using the gasket of the invention;

Fig. 2 is an enlarged view of a portion of Fig. 1 showing the container in the sealed condition with the gasket compressed; and Fig. 3 is a view similar to Fig. 2 showing the container in the unsealed condition with the gasket in its relaxed shape.

The gasket of the invention is intended for use in sealing a cover upon a pressure vessel and will be described herein in conjunction with an oil filter housing. Fig. 1 shows an oil filter and housing of the type conventionally used on diesel trucks, the housing including a container 10 and a cover 11. The container 10 is clamped to mounting brackets 12 by straps 13 which partially encircle the container, the mounting brackets being adapted for mounting on a vehicle or the like. An inlet valve 14, an outlet valve 15, and a drain valve 16 are positioned at the bottom of the container 10. An outlet tube 17 is mounted on the outlet valve 15 and a conventional filter pack 18 is positioned in the container around the outlet tube. A hold-down shaft 19 is threaded into the outlet tube 17 and clamps the pack 18 in position. The cover 11 encloses the hold-down shaft 19 and the upper end of the pack 18 and includes a centering tube 20 telescopingly receiving the shaft 19 for maintaining the pack centrally located in the housing. A vent plug 21 is threadedly mounted in the centering tube.

The sealing structure for joining the container and cover includes abutting flanges on the container and cover, and a clenching band for forcing the two together, this sealing structure being shown in detail in our U.S. Patent No. 2,801,764. Flanges 25, 26 are formed on the container 10 and cover 11, respectively. Each of these flanges includes a sloping side wall 27 which is straight, and a curved peripheral end 28, which ends are adapted to seat against one another when the cover is clamped to the container (Fig. 2).

The sealing structure includes a retaining ring 30 having an annular internal wall portion 31 held against the inside of the housing 10 so as to project from this housing past its end 28. The upper end of the retaining ring is bent over to include a curved annular top 32 and an outer cylindrical wall 33 attached to the top 32, which outer wall projects back parallel to the interior wall 31 within the space between the flanges 25, 26, (Fig. 2)

A clenching band 40 for drawing the cover and container together, is composed of a plurality of sections 41, each of which is formed in the shape of a segment of a single circle. Adjacent sections of the band are joined together by pivot links 42 and two adjacent sections are attached by a screw coupling 43 permitting the band to be opened for positioning around the container and cover and to be drawn together for bringing the cover and container into abutment. The pivot links and screw coupling are shown in detail in our aforementioned patent No. 2,801,764, which description will not be repeated herein.

Each of the sections 41 of the clenching band 40 is provided with an exterior wall 46 which is preferably cylindrical in shape and with side walls 47 having the same slope as the side walls 27 of the container and cover (Fig. 3). The side walls of the clenching band are intended to engage the corresponding side walls of the cover and container as shown in Fig. 3, so that when the clenching band is tightened by actuation of the screw coupling, the section of the band of Figs. 2 and 3 will be moved to the right, bringing the cover and container into abutment as seen in Fig. 2.

The outer wall 33 of the retaining ring 30 and the side wall 27 of the container 10 form an annular gasket receptacle in which a gasket 50 is positioned. This gasket is made of a resilient material such as rubber, neoprene, or any of the other materials which are suitable for use in conventional O-rings. However, the gasket has a particular cross-sectional shape as shown in its relaxed position in Fig. 3. The gasket has a cylindrical inner wall 51 and a conical bottom 52 which intersect at substantially the same acute angle as the outer wall 33 and side wall 27 which form the gasket receptacle. The gasket 50 preferably also has an outer cylindrical wall 53 concentric with the inner wall 51 with the distance between the walls 51, 53, corresponding to the distance between the wall 33 and end 28 of the container. The cross section of the gasket is trapezoidal and is preferably in the form of an oblique-angled parallelogram. The corners are ordinarily rounded to correspond to the bend radii of the container and cover.

The gasket of the invention may be used in an oil filter housing as shown herein in place of the conventional O-ring to substantially reduce the mechanical load on the sealing structure of the housing because the amount of gasket material which is displaced during sealing is substantially reduced. The mechanical effort required to fill the cavity of the gasket receptacle with this shape of gasket is only a small fraction of the effort required to close around a round gasket. Furthermore, as only a small portion of the material of the gasket is displaced in the sealing operation, the recovery factor of the material is not seriously affected. This permits a much greater number of effective cycles of openings and closures of the unit with the gasket of the invention than with the conventional round gaskets.

We claim as our invention:

In a sealing structure for an oil filter or the like, the combination of: a container having an annular gasket receptacle with vertical, concentric inner and outer walls and a bottom wall joining the inner wall at an acute angle, with said outer wall substantially shorter than said inner wall; a cover for mating with said container and enclosing said gasket receptacle, said cover having a flared lower end terminating in a vertical outer wall, with the vertical outer wall joining the flared end at an obtuse angle, and with said vertical outer wall coincident with the vertical outer wall of said container; a gasket comprising a ring of resilient material with, when relaxed, parallel, concentric inner and outer walls and a cross section in the form of a parallelogram, with the angle at one corner corresponding to said acute angle, said gasket being positioned in said gasket receptacle engaging said inner and bottom walls and with one acute angled corner engageable with said obtuse angle of said cover; and means for clamping said cover against said container for sealing engagement with said gasket.

References Cited in the file of this patent

UNITED STATES PATENTS

| | | |
|---|---|---|
| 541,944 | Palmer | July 2, 1895 |
| 826,104 | Honiss | July 17, 1906 |
| 1,802,735 | Pudelko | Apr. 28, 1931 |
| 1,888,459 | Greve | Nov. 22, 1932 |
| 1,986,057 | Hackworth | Jan. 1, 1935 |
| 2,760,642 | Wallace | Aug. 28, 1956 |
| 2,801,764 | Russel et al. | Aug. 6, 1957 |
| 2,868,576 | Boughton | Jan. 13, 1959 |